United States Patent
Salam et al.

(10) Patent No.: US 10,771,285 B2
(45) Date of Patent: Sep. 8, 2020

(54) METHOD AND APPARATUS FOR MAPPING NETWORK DATA MODELS

(71) Applicant: CISCO TECHNOLOGY, INC., San Jose, CA (US)

(72) Inventors: Samer Salam, Vancouver (CA); Srivathsan Aravamudan, Chennai (IN); Srikanth Mangala Krishnamurhty, Bangalore (IN); Veera Reddy Evuri, Bangalore (IN); Vinaya Shenoy, Bangalore (IN); Ashwin Talanki Narasimha Murthy, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 1086 days.

(21) Appl. No.: 15/201,781

(22) Filed: Jul. 5, 2016

(65) Prior Publication Data
US 2018/0013662 A1    Jan. 11, 2018

(51) Int. Cl.
*H04L 12/46*    (2006.01)
*H04L 12/24*    (2006.01)
*H04L 12/723*   (2013.01)

(52) U.S. Cl.
CPC ...... *H04L 12/4641* (2013.01); *H04L 12/4625* (2013.01); *H04L 41/0226* (2013.01); *H04L 41/145* (2013.01); *H04L 45/507* (2013.01); *H04L 41/12* (2013.01)

(58) Field of Classification Search
None
See application file for complete search history.

(56) References Cited

U.S. PATENT DOCUMENTS

| | | | | |
|---|---|---|---|---|
| 6,061,515 A * | 5/2000 | Chang | .................. | G06F 16/289 717/114 |
| 7,451,071 B2 | 11/2008 | Ferguson et al. | | |
| 7,454,428 B2 * | 11/2008 | Wang | .................. | G06F 16/284 |

(Continued)

OTHER PUBLICATIONS

"S-Match: an open source framework for matching lightweight on topologies", F. Giunchiglia et al., Semantic Web Journal, IOS Press, 2010.

*Primary Examiner* — Backhean Tiv
(74) *Attorney, Agent, or Firm* — Cindy Kaplan

(57) ABSTRACT

In one embodiment, a method includes processing network data models at a network device operating in a network comprising a plurality of network components, each of the network components associated with one of the network data models, performing semantic matching at the network device for at least two of the network data models, the semantic matching comprising computing labels for elements of the network data models utilizing label computation algorithms configured for notational conventions used in the network data models, computing contexts for the elements based on a hierarchy of each of the network data models, removing one or more of the labels used to form the contexts to create reduced contexts, and computing a semantic relationship for the reduced contexts of the network data models. The network data models are mapped at the network device based on the semantic matching for use in a network application. An apparatus and logic are also disclosed herein.

20 Claims, 5 Drawing Sheets

(56) References Cited

U.S. PATENT DOCUMENTS

| | | | | |
|---|---|---|---|---|
| 7,499,902 | B2* | 3/2009 | Datla | H04L 41/16 706/45 |
| 7,721,304 | B2* | 5/2010 | Datla | H04L 41/0213 706/21 |
| 7,886,080 | B2* | 2/2011 | Sajassi | H04L 12/4625 370/254 |
| 8,838,653 | B2* | 9/2014 | Athreya | G06F 16/214 707/803 |
| 9,280,583 | B2* | 3/2016 | Duan | G06F 16/24545 |
| 9,311,599 | B1* | 4/2016 | Attenberg | G06N 5/02 |
| 9,900,209 | B2* | 2/2018 | Dec | G06F 11/30 |
| 10,263,852 | B2* | 4/2019 | Prabakaran | H04L 41/145 |
| 2002/0082820 | A1* | 6/2002 | Ferguson | H04L 41/024 703/22 |
| 2004/0083199 | A1* | 4/2004 | Govindugari | G06F 16/215 |
| 2005/0131920 | A1* | 6/2005 | Rust | G06F 16/84 |
| 2006/0248045 | A1* | 11/2006 | Toledano | H04L 63/0272 |
| 2007/0288419 | A1* | 12/2007 | Strassner | G06N 5/02 706/55 |
| 2007/0288467 | A1* | 12/2007 | Strassner | H04L 41/0226 |
| 2008/0168017 | A1* | 7/2008 | Sreedhar | G06F 8/10 706/47 |
| 2009/0320093 | A1* | 12/2009 | Glazier | G06F 8/10 726/1 |
| 2010/0211936 | A1* | 8/2010 | Schmitz | B60R 16/0234 717/136 |
| 2011/0131525 | A1* | 6/2011 | Majumder | G06F 30/39 715/802 |
| 2012/0110028 | A1* | 5/2012 | Athreya | G06F 16/214 707/803 |
| 2013/0031117 | A1* | 1/2013 | Mandelstein | G06F 16/84 707/758 |
| 2013/0031499 | A1* | 1/2013 | Vishnubhatta | G06Q 10/08 715/765 |
| 2015/0019991 | A1* | 1/2015 | Kristj nsson | H04L 41/0853 715/747 |
| 2016/0026631 | A1* | 1/2016 | Salam | H04L 41/16 707/694 |
| 2016/0098429 | A1* | 4/2016 | Suarez | G06F 16/213 707/808 |
| 2016/0149761 | A1* | 5/2016 | Liu | H04L 41/0889 709/221 |
| 2017/0011306 | A1* | 1/2017 | Kim | G06N 20/00 |
| 2018/0013662 | A1* | 1/2018 | Salam | H04L 41/145 |
| 2018/0176096 | A1* | 6/2018 | Prabakaran | H04L 41/145 |
| 2018/0316566 | A9* | 11/2018 | Lee | H04L 41/5051 |
| 2019/0052549 | A1* | 2/2019 | Duggal | G06Q 30/0635 |

* cited by examiner

METHOD AND APPARATUS FOR MAPPING NETWORK DATA MODELS

TECHNICAL FIELD

The present disclosure relates generally to communication networks, and more particularly, to mapping network data models.

BACKGROUND

The network industry is converging on the adoption of model-driven APIs (Application Programming Interfaces) as the mechanism of choice for device manageability, especially in the context of SDN (Software Defined Networking) and NFV (Network Functions Virtualization). However, data model diversity continues to be a problem, with a plethora of competing models (e.g., vendor proprietary models, different standard body/forum models, customer specific models) available for the same technology or feature.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
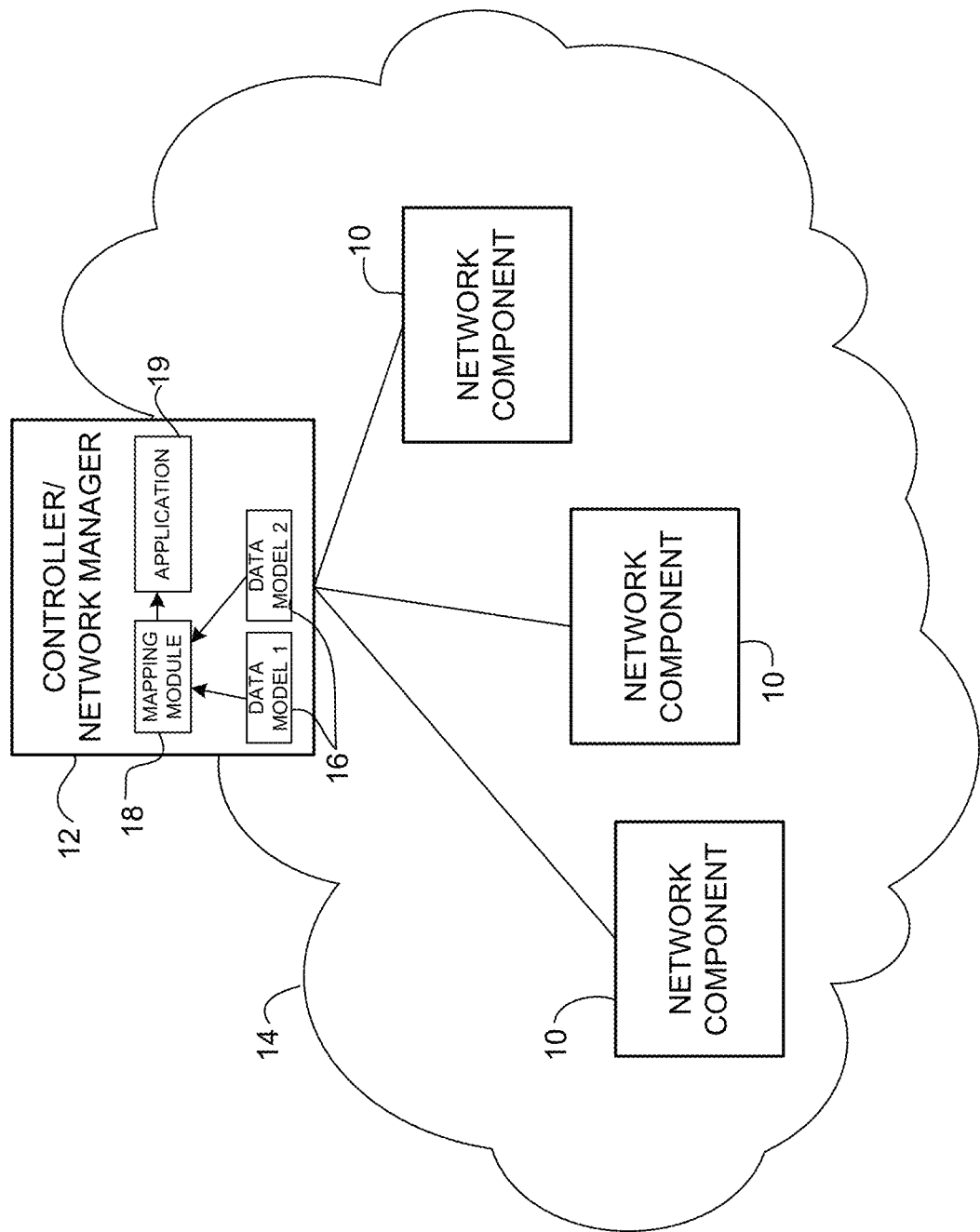
FIG. 1 illustrates an example of a network in which embodiments described herein may be implemented.

In one embodiment, a method generally comprises processing network data models at a network device operating in a network comprising a plurality of network components, each of the network components associated with one of the network data models, performing semantic matching at the network device for at least two of the network data models, the semantic matching comprising computing labels for elements of the network data model utilizing label computation algorithms configured for notational conventions used in the network data models, computing contexts for the elements based on a hierarchy of each of the network data models, removing one or more of the labels used to form the contexts to create reduced contexts, and computing a semantic relationship for the reduced contexts of the network data models. The method further includes mapping the network data models at the network device based on the semantic matching for use in a network application.

In another embodiment, an apparatus generally comprises an interface for receiving network data in a network comprising a plurality of network components, each of the network components associated with one of a plurality of network data models, a processor for performing semantic matching for at least two of the network data models, the semantic matching comprising computing labels for elements of the network data models utilizing label computation algorithms configured for notational conventions used in the network data models, computing contexts for the elements based on a hierarchy of each of the network data models, removing one or more of the labels used to form the contexts to create reduced contexts, and computing a semantic relationship for the reduced contexts of the network data models. The processor is further configured for mapping the network data models based on the semantic matching for use in a network application. The apparatus includes memory for storing a lexical database for use in the semantic matching.

In yet another embodiment, logic is encoded on one or more non-transitory computer readable media for execution and when executed operable to process network data models at a network device operating in a network comprising a plurality of network components, each of the network components associated with one of the network data models, perform semantic matching for at least two of the network data models, the semantic matching comprising computing labels for elements of the network data models utilizing label computation algorithms configured for notational conventions used in the network data models, computing contexts for the elements based on a hierarchy of each of the network data models, removing one or more of the labels used to form the contexts to create reduced contexts, and computing a semantic relationship for the reduced contexts of the network data models. The logic is further operable to map the network data models based on the semantic matching for use in a network application.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network data models often evolve over time and may not maintain commonalities across platforms. Although standard bodies such as IETF (Internet Engineering Task Force) maintain common data models for most networking domain artefacts, almost all vendors have their own add-ons to the common data model. Because of this heterogeneity across devices, collecting the knowledge required to manage and operate the network becomes a labor intensive and error prone process. While multiple network management and orchestration tools exist, network operation continues to be a high-touch task relying on highly trained staff.

Network data model diversity needs to be mediated in order for an application to utilize network data associated with the data model. In conventional network systems, this mediation relies on brute-force design-time manual mapping of the data models. For example, subject matter experts may identify mapping between objects by inspecting various models, and then implementing mapping in software code on a system. Performing the mapping between models manually is not a trivial task. In many instances, the models differ in the labels chosen for the same logical node, and the models often diverge in the organization of the node hierarchies. Thus, manual mapping between different data models is not easily achieved.

Semantic matching is a data science technique used to identify data that is semantically related. For any graph like structures such as XML (Extensible Markup Language) schema or ontologies, semantic matching is a function that identifies nodes in two structures that semantically correspond to one another. For example, data nodes for "TCP/IP" and "Protocol" have semantic similarity because of hyponymy relation between the two. Linguistic resources such as WordNet may be used to capture information that is semantically related. While there may be research into semantic matching algorithms and their applicability to Web service composition, search, and natural language processing, exploration is needed for applicability of this technology to the networking domain.

Networking data models (e.g., YANG (Yet Another Next Generation) modules) are different from traditional documents targeted by semantic matching algorithms. Hence, attempting to use semantic matching as a means of detecting semantically equivalent nodes in two YANG models will yield poor results, with most true equivalencies going undetected. This is due to a number of reasons. For example, networking data models are "lightweight" ontologies where concepts are connected by general associations rather than formal semantic connections (e.g., containment, complement, etc.). Also, networking data models use domain specific language, with excessive use of acronyms (e.g. IP (Internet Protocol), OSPF (Open Shortest Path First), AS (Autonomous System), etc.) and other notational conventions (e.g., InterfaceDropCount, multi-area-id) in addition to specialized new senses for English words (e.g. Routing Area, Route Reflector, etc.). Moreover, network data models, even for the same technology, tend to differ significantly in their hierarchical organization. For example, data may be organized with different concepts chosen as the roots of the hierarchy (e.g., VRF (Virtual Routing and Forwarding) based vs. OSPF areas based organization). Furthermore, the depths of the hierarchies rarely match between models even for the same logical node.

The embodiments described herein provide for automatic mapping between diverse network data models. The embodiments may, for example, take as input two network data models, consult a lexical database that has been pre-populated with network domain terminology, run a series of algorithms, and produce as output a semantic analysis of nodes of the data models. As described in detail below, one or more embodiments provide automatic mapping of network data models using semantic matching with tokenization and lemmatization support for notational conventions used in networking data models and enhanced match-making algorithms through context balancing by context reduction. Enhancements to semantic matching algorithms are provided to allow for dynamic mapping of network data models with minimal design-time cost.

Referring now to the drawings, and first to FIG. 1, an example of a network in which embodiments described herein may be implemented is shown. The embodiments operate in the context of a data communication network including multiple network devices (components, elements, nodes). For simplification, only a small number of network devices are shown. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, the network includes a plurality of network components (devices, elements) 10 in communication with a network device 12 (e.g., controller, network management device). The controller 12 may be in communication with any number of network components 10 or networks 14. Data flow paths between the network components 10 and controller 12 may include any number or type of intermediate nodes (e.g., routers, switches, gateways, or other network devices) and communication links, which facilitate passage of data between the devices. Network traffic may traverse one or more networks 14.

The network component 10 may comprise, for example, a router, switch, server, host, endpoint, gateway, client device, mobile device, sensor, IoT (Internet of Things) device, or any other device, element, or component operable to communicate or provide data within a networking environment. Each network component 10 comprises features, parameters, characteristics, configuration parameters, functional definitions, and the like, associated with a data model 16. The data model 16 may describe, for example, how data is represented and accessed and define the structure, syntax, and semantics of the data. The data model 16 may be defined, for example, by a data modeling language such as YANG, which is used to model configuration and state data. The data model 16 may comprise, for example, a vendor proprietary model, standard model, customer specific model, model associated with network operating system or type of device, or any other model for use in identifying one or more parameters, characteristics, operating mode, or other feature of the network component 10. The data model 16 may be, for example, in the form of a MIB (Management Information Base), YANG model, CLI (Command Line Interface) output format, XSD (XML Schema Definition), and the like. The controller 12 receives information from the network components 10 regarding their configuration, functions, capability, characteristics, parameters, state, mode, etc., which may be associated with or defined based on one or more data models 16.

The network device 12 may comprise a controller (e.g., SDN (Software Defined Networking) controller, network manager (e.g., NMS (Network Management Station), or any other network device operable to communicate with a plurality of network components 10 and process network data (e.g., data associated with data models 16) received from the network components. The controller 12 may comprise, for example, an ODL (OpenDaylight) controller (e.g., Service Provider (SP) Software Defined Networking (SDN) controller) or an APIC (Application Policy Infrastructure Controller). The controller or network manager 12 may operate as a stand-alone device or on two or more network devices or network components 10, or in a cloud environment.

The network device 12 comprises a mapping module 18 operable to automatically map heterogeneous data models 16 for use by an application 19, as described in detail below. The mapping module 18 may operate, for example, as embedded manageability or controller software. The application 19 may comprise any type of application or API operable to perform one or more functions based on data received from the network components 10. The mapping module 18 decouples the application 19 from the underlying data received from diverse data models 16 so that the application can operate in environments comprising different types of equipment (e.g., different manufacturers, operating systems, etc.). In the example shown in FIG. 1, the mapping module 18 and application 19 reside on the same network device 12, however, the application 19 may run on another network device in communication with the controller 12, one of the network components 10, or any other network device.

It is to be understood that the network shown in FIG. 1 and described above is only an example and the embodiments described herein may be implemented in networks comprising different network topologies or network devices without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Moreover, the topology illustrated in FIG. 1 and described above is readily scalable and may accommodate a large number of components, as well as more complicated arrangements and configurations. Thus, network nodes (elements, devices) may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communication.

Figure 2:
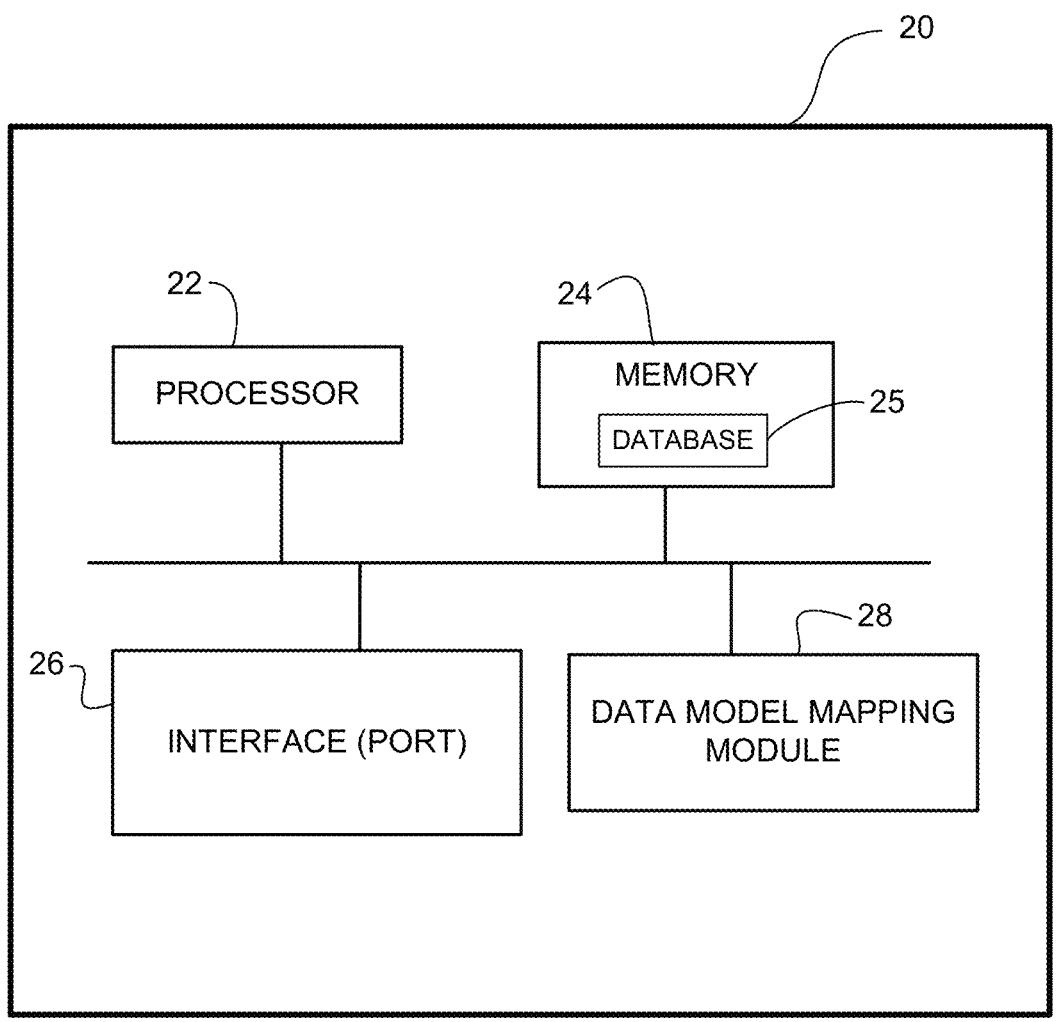
FIG. 2 depicts an example of a network device useful in implementing embodiments described herein.

FIG. 2 illustrates an example of a network device 20 (e.g., controller/network manager 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and mapping module (e.g., logic, software, firmware).

Memory 24 may be a volatile memory or non-volatile storage, which stores various applications, operating systems, modules, and data for execution and use by the processor 22. For example, mapping components (e.g., module, code, logic, software, firmware, etc.) may be stored in memory 24. Memory 24 may also include one or more databases 25 (e.g., lexical database, database comprising data models, database comprising configuration data from network components, management information base). The network device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interface 26 may comprise any number of interfaces (linecards, ports) for receiving data or transmitting data to other devices. For example, the network interface 26 may be configured for receiving data from network components 10 associated with the data models, or transmitting mapping results from the mapping module 18 for use by application 19. The network interface 26 may be configured to transmit or receive data using a variety of different communication protocols. The network interface 26 may include, for example, an Ethernet interface for connection to a computer or network. The interface may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

With the ability to build knowledge systems from domain specific ontologies, ontology matching techniques may be leveraged to identify the semantic similarities across various data models 16 in a networking environment. Once semantic matching is leveraged for data model mapping, a wider set of applicable use cases is opened up, including, for example, automatic translation of configuration commands across platforms for a common networking function (e.g., automatic translation of OSPF configuration commands from a vendor platform-specific model to common IETF model), higher level business solution validation with semantic matching (e.g., service validation in Network Function Virtualization (NFV) by semantically matching a service state at different layers of NFV stack), product recommendation for specific customer feature requirements (e.g., business requirements from customers captured in natural language statements rather than keywords), and other applications. Semantic searching is ideally suited to assert a customer's intent and recommend meaningful results. It is to be understood that the use cases described herein are only examples and that the embodiments may be implemented for other use cases without departing from the scope of the embodiments.

As described below, semantic matching may be used to map the data models 16 and address the heterogeneity issue in the networking domain. Semantic matching is a technique that operates on tree (graph)-like structures and relies on semantic information to identify nodes that are semantically related. Data within the data models may be hierarchically arranged under nodes (also referred to as elements). The data model may comprise nodes in a schema tree that can be instantiated in a data tree. The nodes may be described using natural language labels and concepts may be computed for the labels. The concept of the label may be related to the label meaning in the real world. The label at a node may be local to the node and independent of position of the node in a tree hierarchy. A context of the node may include the meaning of the position that the node has in the tree hierarchy (e.g., extension of concepts of all labels above it in the hierarchy and the node itself). For example, a context may be computed for each node (element) based on the set of labels associated with the element and all of its predecessors in the data model hierarchy. As described below, automatic mapping of data models may be performed by computing the semantic relationship between concepts of contexts assigned to nodes within the data models 16.

Figure 3:
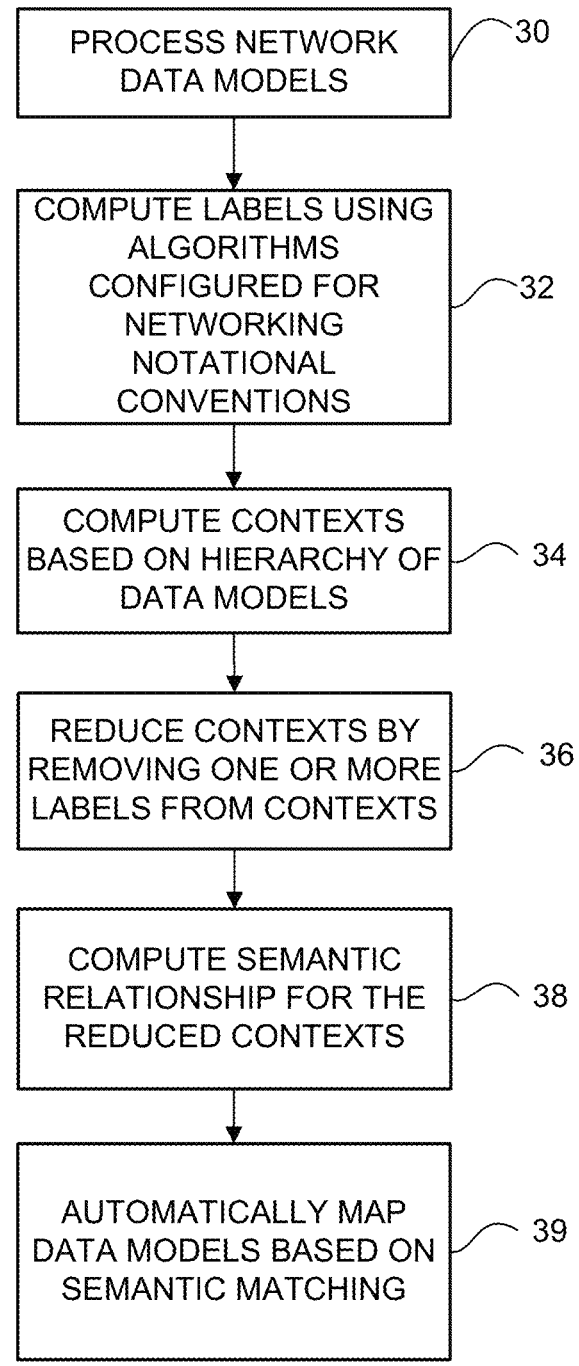
FIG. 3 is a flowchart illustrating an overview of a process for automatic mapping of network data models, in accordance with one embodiment.

FIG. 3 is a flowchart illustrating an overview of a process for mapping network data models, in accordance with one embodiment. At step 30, data models are processed at a network device (e.g., controller, network management station 12 in FIG. 1) operating in a network comprising a plurality of network components 10. The data models may be, for example, loaded by a network operator or pre-installed at the network device. Each of the network components 10 is associated with one of the data models 16. The network device 12 performs semantic matching for at least two of the data models 16. For example, the network device 12 may run a series of algorithms and produce as output a semantic analysis of nodes (elements) of the two data models 16. In one embodiment, the semantic matching includes computing labels for elements (nodes) of the data models 16 utilizing label computation algorithms configured for notational conventions used in the network data models 16 (step 32). Label computation algorithms may be implemented utilizing tokenization and lemmatization support for networking notational conventions (e.g., camel case, pascal case, multiword keywords), as described below.

Contexts may then be computed for the elements based on a hierarchy of each data model (step 34). For example, contexts may be formed from a set of labels (concepts of labels) associated with an element (node) and all of its predecessors. In one or more embodiments, context balancing is then performed by removing one or more of the labels (concepts of labels) used to form the contexts (step 36). In one embodiment, context balancing involves relaxing a matching strategy by removing from the context, the concepts of labels that are not relevant to a matching process. Semantic relationships may then be computed for the reduced contexts of each data model (e.g., between remaining concepts of the contexts) (step 38). The semantic analysis may be used, for example, to indicate whether a first node (in the first model) is equivalent, more general, less general, or disjoint from a second node (in the second model).

The data models 16 may be automatically mapped at the network device 12 based on the semantic matching for use in a network application 19 (step 39). The set of identified equivalences in the analysis may be used to automatically map a node in the first model to a node in the second model at run-time, thereby mediating the differences between the network data models automatically. The design time effort is limited to populating a lexical database with the domain terminology, which is an effort that only has to be done once, independent of the number of data models 16. This allows the application 19 to use any device model 16 of their choosing, and the system is able to map the nodes to their equivalencies when communicating with the network components 10 in their native model.

It is to be understood that the process shown in FIG. 3 and described above is only an example and that steps may be added, deleted, combined, or modified without departing from the scope of the embodiments.

As described below, one or more embodiments may follow semantic matching stages that generally correspond to an S-Match framework, however, the functions performed in several of the stages are different from those performed in conventional S-Match. S-Match is one example of a semantic matching open source framework that may be used to provide semantic matching algorithms and infrastructure for extending the functionality.

Figure 4:
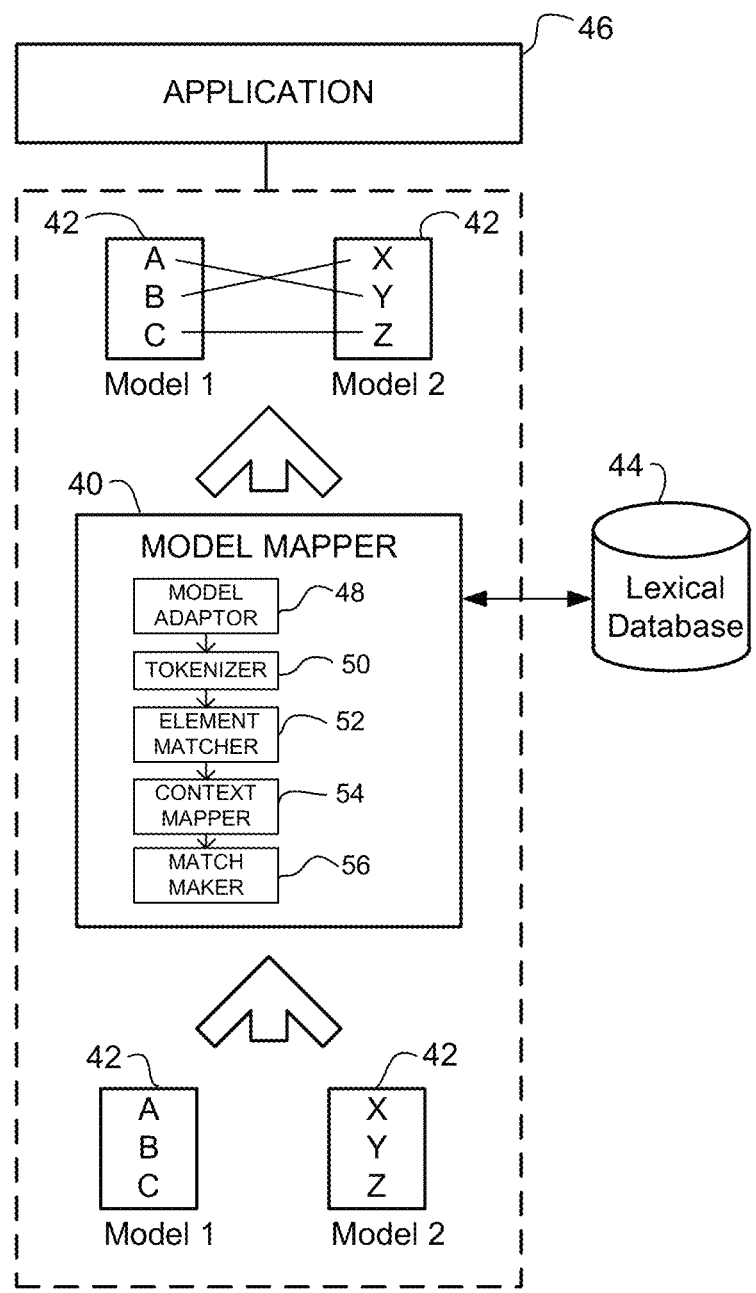
FIG. 4 is a block diagram illustrating details of a data mapping module of FIG. 1, in accordance with one embodiment.

FIG. 4 illustrates mapping of data models 42 (model 1, model 2) at model mapper 40, in accordance with one embodiment. Model 1 comprises nodes (elements) A, B, and C. Model 2 comprises nodes X, Y, and Z. The model mapper 40 uses data from a lexical database 44, which may comprise domain terminology generated at design time. The model mapper 40 shown in FIG. 4 comprises a pipeline of functions that may be logically organized into five stages comprising a model adaptor 48, tokenizer 50, element matcher 52, context mapper 54, and match maker 56.

The model adaptor 48 parses the device data model (e.g. YANG module, XSD (XML Schema Definition)) and generates a uniform, distilled, representation of the model. This distilled representation captures the name associated with every element in the model and the elements' hierarchical organization. The distilled representation is passed to the tokenizer 50.

The tokenizer 50 implements element label computation algorithms configured for notational conventions used in network data models. This stage includes tokenization and lemmatization processes modified to account for common networking notational conventions. More specifically, this stage of the process addresses the fact that network data models use domain specific language, with excessive use of acronyms and notational conventions in addition to specialized new senses for English words. For example, the tokenization process may be configured to handle hyphenated words and camel case and pascal case keywords. This is important because YANG models make heavy use of hyphenated and camel case words. The lemmatization process may be configured to handle multiword keywords. For example, for words such as four-byte-as, instead of breaking this down to three individual keywords (four, byte, and as), they need to be treated as a single keyword for proper context establishment.

The output of the tokenizer 50 is fed to the element matcher 52, which examines labels of the elements computed in the previous stage and produces a semantic relationship matrix between concepts (i.e., meaning) of the element labels of the first input model and concepts of the element labels of the second input model. Element level matching may include, for example, string based matching (exploit string comparison techniques in order to produce semantic relations), sense based matching (identify semantic relation using WordNet senses such as hyponyms, meronyms, etc.), and gloss based matching (compare textual descriptions). In one example, each cell in the matrix indicates whether, for a pair of labels L1 (in model 1) and L2 (in model 2), the concept of L1 is [equivalent OR more general OR less general OR disjoint OR has no relation] to the concept of L2. The relationship matrix is constructed after consulting with the lexical database of networking terms 44, which acts as a form of linguistic oracle. Every cell in this matrix for which a relationship exists (i.e., the cell value is not "has no relation") is referred to as an axiom (e.g., L1 equivalent to L2). Axioms will be used in the last stage (match maker 56) of the processing pipeline, as described below.

Processing is then moved to the context mapper stage 54, which computes the meaning of the element considering its position in the model hierarchy. To this end, a context is computed for every element. The context is formed from the set of labels associated with the element and all of its predecessors in the model hierarchy. A complex concept is computed for the context, which is effectively a description logic formula of the meaning of the labels.

The output of the context mapper 54 is fed to the match maker stage 56. Conventional match makers are tailored for formal ontologies and hence are very "strict" in their matching strategy. Conventional algorithms expect a relationship for every concept of a label present in the context. This results in excessive failures when used for the comparison of informal ontologies such as YANG models (e.g., equivalent elements being incorrectly categorized due to the fact that network data models tend to differ significantly in their hierarchical organization). This issue is addressed by providing a method of context balancing through context reduction. The approach revolves around the fact that not every concept of a label in an informal ontology can be expected to have a relationship in a given context.

In one embodiment, the matching strategy is relaxed by removing from the context, the concepts of labels that are not relevant to the decision process, without losing the essential concepts of the context. For example, two contexts A and B may be considered to be equivalent if it is possible to identify two contexts A' and B', which are reduced forms of A and B respectively, where A' and B' are equivalent.

The formulation of the reduced contexts A' and B' is important to the algorithm. If the contexts are not reduced, the match maker 56 may yield no results, which is the case when conventional implementations are used. If the contexts are over-reduced, the match maker 56 will yield false positives (i.e., declare equivalencies that are not correct).

The reduced contexts may be identified by classifying the concepts of labels in a given context into two buckets: prime and non-prime. Prime concepts influence the decision making process, whereas non-prime concepts do not. As such, non-prime concepts can be safely removed from the contexts, making the comparison balanced.

In one embodiment, the following criteria are used to identify the prime concepts. Concepts of labels associated with elements for which the element matcher 52 computed axioms are considered prime. Concepts of labels associated with leaf elements (i.e., nodes with no children) in the model are considered prime. Concepts of labels that occur multiple times (e.g., greater than or equal to two) in a context are considered prime.

After the contexts are balanced, the match maker 56 computes the semantic relationship between the concepts of the contexts using the axioms calculated by the element matcher 52. This may be achieved by reformulating the problem into a propositional satisfiability problem between each pair of contexts and solving the problem using a SAT (satisfiability) engine. The SAT engine produces a semantic relationship matrix between the concepts of the contexts of the first input model and the concepts of the contexts of the second input model. Each cell in the matrix indicates, for a pair of contexts C1 (in model 1) and C2 (in model 2), if C1 is [equivalent OR more general OR less general OR disjoint OR has no relation] to C2. Equivalent contexts correspond to semantically equivalent nodes in the two device data models.

Figure 5:
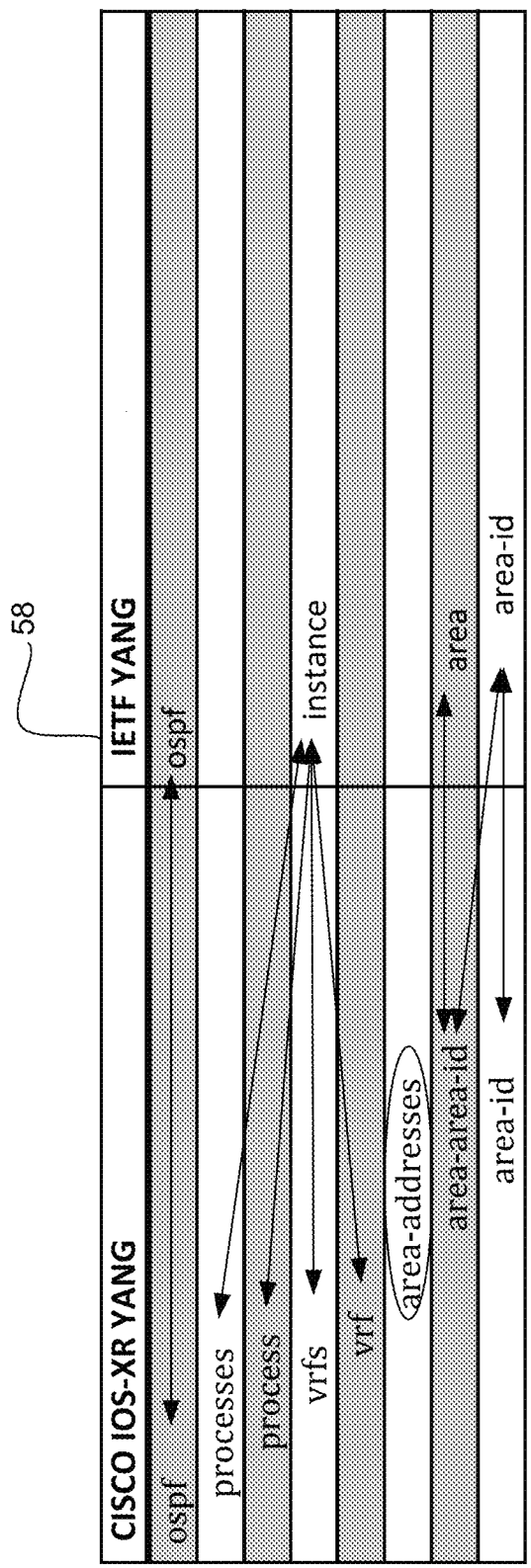
FIG. 5 is an example illustrating mapping of two different data models.

FIG. 5 illustrates an example comparing two network data models utilizing the process described above with respect to FIG. 4. As shown in Table 58 of FIG. 5, the CISCO IOS-XR YANG data model includes elements ospf, processes, process, vrfs, vrf, area-addresses, area-area-id, and area-id. The IETF YANG data model includes elements ospf, instance, area, and area-id. The arrows correspond to axioms where the concepts of the labels of the elements are equivalent. The concepts of the label "area-addresses" is non-prime (not axiom, not leaf element, does not occur multiple times), hence it is reduced (eliminated) from the context. This yields the final result that the context: ospf/processes/process/vrfs/vrf/area-addresses/area-area-id/area-id is equivalent to the context: ospf/instance/area/area-id. In other words, the YANG nodes associated with these two contexts are equivalent.

The following provides an example of an experimental test results of data model comparisons using conventional S-Match and the embodiments described herein.

In this example, an OSPF comparison is performed with data models for Cisco Common and Cisco IOS XR platform. S-Match framework operates on various input schema formats such as XML, tab de-limited, etc. In this example, the YANG model was converted to a tab de-limited graph structure using Python script.

In order to provide a sense of scale for the data model comparison, schema definitions for OSPF data models had the following word counts shown in Table I.

TABLE I

OSPF Data Model Size

|  | Cisco Common OSPF model | Cisco IOS XR OSPF model |
|---|---|---|
| Number of Lines in YANG Models | 3754 | 870 |
| Number of Words in S-Match Schema Input | 3539 | 1337 |

With out-of-box implementation of S-Match, OSPF data model comparison fares very poor, as shown in Table II. Almost all of the results are false positives. It is mainly due to lack of OSPF schema related words in WordNet database and inefficiency of S-Match algorithm if the nodes that are being compared have an imbalance with their contexts. For example, if the source node hierarchy has elements that do not have any correspondence to any of the nodes in destination nodes, this leads to highly imbalanced node contexts as input to comparison engine and thus results in skewed results.

TABLE II

OSPF Schema Comparison with Out-of-Box S-Match Implementation

| Equivalences | Less General | More General | Disjoint |
|---|---|---|---|
| 0 | 0 | 0 | 69 |

As previously described, one or more embodiments provide algorithmic enhancement to S-Match that includes improvements with tokenization to handle hyphenated words and camel case and pascal case keywords. This is important because YANG models make heavy use of hyphenated and camel case words. Also added were improvements with lemmatization to handle multiword keywords. For example, for words such as four-byte-as, S-Match by default splits into individual keywords as four, byte, and as. For OSPF comparison, it may be treated as a single word to avoid skewed results.

Another algorithmic enhancement in the embodiments is context balancing. Out-of-box S-Match is very strict and cannot be used for informal ontologies such as YANG models. The algorithm expects a relation for every element present in the context. This results in a large number of failures when used for the comparison on YANG models. As described above, the embodiments resolve this issue through context balancing. The context balancing revolves around the fact that not every element in an informal ontology can be expected to have a relation in context. Hence, a horn clause is relaxed by reducing the elements that are not present in the axiom. In other words, A=B if exist A' and B' where A'=B'. A' and B' may be constructed using a number of strategies for reduced context involving leaf nodes, implicit elements within context, and key elements (model specific static elements and learned elements).

With these enhancements, OSPF comparison yields the results shown below in Table III.

TABLE III

| OSPF Schema Comparison with Algorithmic Enhancements | | | |
|---|---|---|---|
| Equivalences | Less General | More General | Disjoint |
| 86 | 987 | 20653 | 1407 |

To further improve the results, networking related words and relations may be added to WordNet. This resulted in substantial improvement in identification of semantic relations as shown in Table IV below.

TABLE IV

| OSPF Schema Comparison with WordNet Addition | | | |
|---|---|---|---|
| Equivalences | Less General | More General | Disjoint |
| 345 | 6130 | 18120 | 15477 |

Among the 345 equivalences identified by S-Match, a manual comparison was made to compare the YANG models to check true equivalences and it was found that 40% of reported equivalences were true equivalences.

Results of the above experiment are provided as an example of improvements that may be realized in semantic matching utilizing the embodiments described herein as compared with conventional S-Match implementation. As can be observed from the foregoing, the embodiments provide enhancement to semantic matching algorithms to allow for dynamic mapping of network data models.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving network data models as input at a model mapping module at a network device in communication with a plurality of network components in a network, each of the network components in the network associated with one of the network data models, the model mapping module operable to access a lexical database stored in memory at the network device;
    storing the network data models in said memory;
    processing the stored network data models at the model mapping module using data from the lexical database, wherein processing comprises performing semantic matching automatically at the model mapping module for at least two of the network data models received at the model mapping module, said semantic matching comprising computing labels for elements of the network data models utilizing label computation algorithms configured for notational conventions used in the network data models, computing contexts for the elements based on a hierarchy of each of the network data models, removing one or more of said labels used to form said contexts to create reduced contexts, and computing a semantic relationship for said reduced contexts of the network data models at the model mapping module;
    mapping the network data models at the network device based on said semantic matching performed at the model mapping module for use in a network application at the network device;
    transmitting mapping information for the network data models to the network application operating at the network device; and
    using said mapping information by the network application while communicating with the network components, wherein the mapping module decouples the network application from data received from the network data models.

2. The method of claim 1 wherein the network device comprises a controller or a network management device.

3. The method of claim 1 wherein the network data models comprise YANG (Yet Another Next Generation) data models.

4. The method of claim 1 wherein said label computation algorithms comprise a tokenization process and said notational conventions comprise camel case and pascal case keywords.

5. The method of claim 1 wherein said label computation algorithms comprise a lemmatization process and said notational conventions comprise multiword keywords.

6. The method of claim 1 wherein removing one or more of said labels to create said reduced contexts comprises classifying concepts of labels as a prime concept or a non-prime concept and removing said concepts of labels classified as non-prime concepts.

7. The method of claim 6 wherein said concepts of labels classified as said prime concept comprise said concepts of labels associated with elements computed as axioms, said axioms comprise said concepts of labels from a first of said data models comprising a semantic relationship with said concepts of labels from a second of said data models.

8. The method of claim 6 wherein said concepts of labels classified as said prime concept comprise said concepts of labels associated with leaf elements in the network data models.

9. The method of claim 6 wherein said concepts of labels classified as said prime concept comprise said concepts of labels occurring multiple times.

10. An apparatus comprising:
    an interface for receiving network data models as input at a model mapping module in a network comprising a plurality of network components, each of the network components associated with one of the network data models;
    a processor for automatically performing semantic matching for at least two of the network data models, said semantic matching comprising computing labels for elements of the network data models utilizing label computation algorithms configured for notational conventions used in the network data models, computing contexts for the elements based on a hierarchy of each of the network data models, removing one or more of said labels used to form said contexts to create reduced contexts, and computing a semantic relationship for said reduced contexts of the network data models, mapping the network data models based on said semantic matching for use in a network application at the network device, transmitting mapping information for the network data models to the network application operating at the network device, and using said mapping information by the network application while communicating with the network components, wherein the mapping module decouples the network application from data received from the network data models; and memory for storing the network data models and a lexical database for use in said semantic matching.

11. The apparatus of claim 10 wherein the lexical database comprises domain terminology stored in the database for use by the processor at run-time.

12. The apparatus of claim 10 wherein the apparatus comprises a controller or a network management device.

13. The apparatus of claim 10 wherein the network data models comprise YANG (Yet Another Next Generation) data models.

14. The apparatus of claim 10 wherein the processor comprises a tokenizer for implementing said label computation algorithms, the tokenizer configured for performing a tokenization process and a lemmatization process.

15. The apparatus of claim 14 wherein said tokenization process is configured for processing camel case and pascal case keywords.

16. The apparatus of claim 14 wherein said lemmatization process is configured for processing multiword keywords.

17. The apparatus of claim 10 wherein removing one or more of said labels to create said reduced contexts comprises removing concepts of labels for which no relationship was identified between the network data models in an element matching process, concepts of labels not associated with leaf elements in the network data models, and concepts of labels that occur only once.

18. One or more non-transitory computer readable media encoded with logic for execution and when executed operable to:

process network data models received as input at a model mapping module at a network device in communication with a plurality of network components in a network, each of the network components in the network associated with one of the network data models, the model mapping module operable to access a lexical database stored in memory at the network device;

perform semantic matching for at least two of the network data models, said semantic matching comprising computing labels for elements of the network data models utilizing label computation algorithms configured for notational conventions used in the network data models, computing contexts for the elements based on a hierarchy of each of the network data models, removing one or more of said labels used to form said contexts to create reduced contexts, and computing a semantic relationship for said reduced contexts of the network data models;

map the network data models based on said semantic matching performed at the model mapping module for use in a network application at the network device;

transmit mapping information for the network data models to a network application operating at the network device; and use said mapping information by the network application while communicating with the network components, wherein the mapping module decouples the network application from data received from the network data models.

19. The one or more non-transitory computer readable media of claim 18 wherein said label computation algorithms comprise a tokenization process for camel case and pascal case keywords and a lemmatization process for multiword keywords.

20. The one or more non-transitory computer readable media of claim 18 wherein removing one or more of said labels to create said reduced contexts comprises removing concepts of labels for which no relationship was identified between the network data models in an element matching process, concepts of labels not associated with leaf elements in the network data models, and concepts of labels that occur only once.

* * * * *